US008161325B2

(12) United States Patent
Calman et al.

(10) Patent No.: US 8,161,325 B2
(45) Date of Patent: Apr. 17, 2012

(54) RECOMMENDATION OF RELEVANT INFORMATION TO SUPPORT PROBLEM DIAGNOSIS

(75) Inventors: Matthew Alexander Calman, Charlotte, NC (US); Earl Wagner, Boston, MA (US); Erik S. Ross, Charlotte, NC (US); Srinivas Darga, Charlotte, NC (US); Patrick Kelly, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 12/790,097

(22) Filed: May 28, 2010

(65) Prior Publication Data
US 2011/0296243 A1 Dec. 1, 2011

(51) Int. Cl.
*G06F 11/00* (2006.01)
(52) U.S. Cl. .......................................................... 714/26
(58) Field of Classification Search ...................... 714/26
See application file for complete search history.

(56) References Cited

U.S. PATENT DOCUMENTS

| | | | |
|---|---|---|---|
| 4,839,853 A | 6/1989 | Deerwester et al. | |
| 5,111,384 A * | 5/1992 | Aslanian et al. | 714/26 |
| 5,404,503 A * | 4/1995 | Hill et al. | 714/31 |
| 5,680,541 A * | 10/1997 | Kurosu et al. | 714/26 |
| 6,006,016 A * | 12/1999 | Faigon et al. | 714/48 |
| 6,012,152 A * | 1/2000 | Douik et al. | 714/26 |
| 6,260,048 B1 * | 7/2001 | Carpenter et al. | 1/1 |
| 6,289,353 B1 | 9/2001 | Hazlehurst et al. | |
| 6,442,542 B1 * | 8/2002 | Ramani et al. | 714/25 |
| 6,473,659 B1 * | 10/2002 | Shah et al. | 700/79 |
| 6,643,799 B1 * | 11/2003 | Bonissone et al. | 714/26 |
| 7,146,536 B2 * | 12/2006 | Bingham et al. | 714/26 |
| 7,409,593 B2 * | 8/2008 | Aaron | 714/26 |
| 7,434,099 B2 * | 10/2008 | Flynn et al. | 714/26 |
| 7,577,634 B2 | 8/2009 | Ryan et al. | |
| 7,610,279 B2 | 10/2009 | Budzik et al. | |
| 7,617,199 B2 | 11/2009 | Budzik et al. | |
| 7,617,200 B2 | 11/2009 | Budzik et al. | |
| 7,650,272 B2 * | 1/2010 | Przytula et al. | 703/20 |
| 7,757,120 B2 * | 7/2010 | Ogle et al. | 714/26 |
| 7,765,439 B2 * | 7/2010 | Kasubuchi et al. | 714/48 |
| 7,788,536 B1 * | 8/2010 | Qureshi et al. | 714/38.14 |
| 7,840,856 B2 * | 11/2010 | Apte et al. | 714/48 |
| 7,890,802 B2 * | 2/2011 | Gerber | 714/26 |
| 7,900,201 B1 * | 3/2011 | Qureshi et al. | 717/174 |
| 8,006,121 B1 * | 8/2011 | Samoilova et al. | 714/2 |

(Continued)

OTHER PUBLICATIONS

"tf–idf"; From Wikipedia, retrieved from URL http://en.wikipedia.org/wiki/Tf%E2%80%93idf; retrieved on May 26, 2010.

(Continued)

*Primary Examiner* — Robert Beausoliel, Jr.
*Assistant Examiner* — Joshua P Lottich
(74) *Attorney, Agent, or Firm* — Banner & Witcoff, Ltd.; Michael A. Springs

(57) ABSTRACT

The disclosure generally relates to knowledge retrieval using a knowledgebase storing general and/or expert knowledge. In particular, the disclosure relates to using complex retrieval techniques to implement an enhanced troubleshooting system that provides relevant information. Aspects of the disclosure retrieve relevant documents to assist in troubleshooting by reasoning with stored representations about the faulty system and its operating environment. After receiving a description of the symptoms and/or other information related to the problem, the system may recommend textual and/or non-textual documents with relevant information for identifying the cause of the problem and restoring operation.

19 Claims, 3 Drawing Sheets

U.S. PATENT DOCUMENTS

| | | | |
|---|---|---|---|
| 8,024,617 B2* | 9/2011 | Kudo et al. | 714/38.1 |
| 2004/0138899 A1 | 7/2004 | Birnbaum et al. | |
| 2004/0255232 A1 | 12/2004 | Hammond et al. | |
| 2004/0267728 A1* | 12/2004 | Delic et al. | 707/3 |
| 2005/0028156 A1 | 2/2005 | Hammond et al. | |
| 2005/0081079 A1* | 4/2005 | Cheston et al. | 714/2 |
| 2006/0212446 A1 | 9/2006 | Hammond et al. | |
| 2006/0277455 A1 | 12/2006 | Yamada et al. | |
| 2008/0059451 A1 | 3/2008 | Musgrove | |
| 2008/0065577 A1* | 3/2008 | Chefalas et al. | 706/47 |
| 2008/0126331 A1 | 5/2008 | Shepherd | |
| 2008/0288821 A1* | 11/2008 | Aaron | 714/26 |
| 2009/0003345 A1* | 1/2009 | Chang et al. | 370/392 |
| 2009/0055684 A1* | 2/2009 | Jamjoom et al. | 714/26 |
| 2009/0094060 A1 | 4/2009 | Johnson et al. | |
| 2009/0265330 A1 | 10/2009 | Cheng et al. | |
| 2010/0031095 A1* | 2/2010 | Ruan et al. | 714/57 |
| 2010/0125745 A1* | 5/2010 | Kogan et al. | 714/1 |
| 2010/0192005 A1* | 7/2010 | Das et al. | 714/2 |
| 2010/0318853 A1* | 12/2010 | Beg et al. | 714/37 |
| 2011/0047414 A1* | 2/2011 | Kudo et al. | 714/37 |
| 2011/0145640 A1* | 6/2011 | Hooks | 714/26 |

OTHER PUBLICATIONS

"Knowledge base", From Wikipedia, retrieved from URL http://en.wikipedia.org/wiki/Knowledge_base; retrieved on May 27, 2010.

Privu, Adrian, "The Code Project, Your Development Resource; Anatomy of a relevant Search Engine (part 1)", retrieved from URL: http://www.codeproject.com/KB/IP/AnatomyOfASearchEngine1.aspx?display=Print; retrieved on May 26, 2010.

Common Sense Computing Initiative, at the MIT Media Lab, retrieved from URL: http://csc.media.mit.edu/mode/1; retrieved on May 26, 2010.

Birnbaum, et al; "Task Aware Information Access for Diagnosis of Manufacturing Problems", IUIi05, Jan. 9-12, 2005.

\* cited by examiner

RECOMMENDATION OF RELEVANT INFORMATION TO SUPPORT PROBLEM DIAGNOSIS

RELATED APPLICATIONS

This application is related to U.S. patent application Ser. No. 12/790,111 entitled, "Survey Analysis and Categorization Assisted by a Knowledgebase", which was filed on May 28, 2010, the contents of which is herein incorporated by reference in its entirety.

TECHNICAL FIELD

The disclosure generally relates to knowledge retrieval using a knowledgebase storing at least both of general and/or expert knowledge. In particular, the disclosure relates to using enhanced retrieval techniques to implement an enhanced troubleshooting system providing relevant information.

BACKGROUND

The analysis of textual documents to ascertain which documents are closest matches is a recognized objective in computer science. A basic approach to accomplishing this objective is to calculate the occurrence of each word (e.g., a word count) in a textual document to identify other documents with the same or similar word counts. While this approach may be relatively easy to perform, it has numerous drawbacks.

One derivation on the basic "word count" approach includes TFIDF techniques. WIKIPEDIA explains that the "tf-idf weight (term frequency-inverse document frequency) is a weight often used in information retrieval and text mining. This weight is a statistical measure used to evaluate how important a word is to a document in a collection or corpus. The importance increases proportionally to the number of times a word appears in the document but is offset by the frequency of the word in the corpus. Variations of the tf-idf weighting scheme are often used by search engines as a central tool in scoring and ranking a document's relevance given a user query. One of the simplest ranking functions is computed by summing the tf-idf for each query term; many more sophisticated ranking functions are variants of this simple model."

A more sophisticated approach in the art is latent semantic indexing (LSI) or latent semantic analysis (LSA). Many Internet search sites reprioritize their result rankings based on LSI/LSA. LSI/LSA enables a search engine to figure out what a document is about without requiring that the search query text match exactly. LSI/LSA uses natural language processing and vectorial semantics to achieve enhanced search rankings. LSI/LSA model the context within which words or phrases are used to recommend other documents with similar words or phrases. LSI/LSA offers better performance than a "word count" approach.

The Massachusetts Institute of Technology Media Lab has developed numerous publicly available products for performing sophisticated semantic analysis of documents. According to their "Common Sense Computing Initiative" website, their current research in that area addresses "[c]reating systems that understand the connections between everyday events and objects, people's beliefs, [and] the way they express them in language, [u]sing this understanding to make computers more 'people-friendly', [d]eveloping representations for different varieties of common sense knowledge, [d]eveloping methods for acquiring common sense knowledge from people, corpora, and the web, developing architectures that let us fuse these diverse techniques into flexible and resourceful systems." That lab has applications and/or concepts such as ConceptNet, Divisi, Luminoso, CrossBridge, AnalogySpace, PerspectiveSpace, Blending, and Open Mind Common Sense that are readily available to select members of the public under particular licensing agreements. Various levels of information about one or more of these applications/concepts is publicly available via the lab's Internet website and in the information disclosure statement accompanying this filing; the information disclosure statement and accompanying copies of cited references are herein incorporated by reference in their entirety.

Meanwhile, on an unrelated topic, technicians, engineers, and managers working for a company may respond to an outage of customer-facing services by first trying to restore service before developing a more permanent solution. Service outages may be due to one or more various problems, including software/hardware that has been incorrectly installed/modified/upgraded, or problems with data feeds from service providers or vendors, and other problems. Over the course of service restoral, the people responsible for troubleshooting may coordinate to gather and collect information about the current problems and malfunctioning systems and record them in an incident ticket. As they work on restoral, they may refer to several information resources, such as "playbooks" (i.e., documents that provide a sequence of steps or flow chart detailing the steps to restoral based on the problem description), "maps" (i.e., physical, logical and transactional maps of systems involved), and/or "flows" (i.e., high-level diagrams of key applications and processes). Finally, they may also peruse historical information, including previous, similar incidents, and investigate previous changes that may have caused the current incident. Current tools for assisting in troubleshooting techniques are deficient.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

In one embodiment in accordance with aspects of the disclosure a method is disclosed for steps performed by an enhanced troubleshooting system. The system may receive input data and extract concepts from that data. The concepts are submitted to a backend system with an optimized knowledgebase. As a result, the backend database returns a data structure (i.e., a results record) with relevant information for troubleshooting. The system may include a reporting module that generates a formatted output using the results record. One skilled in the art will appreciate that one or more steps disclosed herein may be performed by a processor configured to executed computer-executable instructions, such as those within a module. Moreover, an apparatus and systems are contemplated for executing the method disclosed herein.

In addition, in one embodiment, a tangible computer-readable medium storing computer-executable instructions that when executed cause an electronic processor to perform one or more of the aforementioned steps from the preceding paragraph is disclosed. The computer-readable medium may be located in a computing device configured to execute the approach steps of the aforementioned method.

BRIEF DESCRIPTION OF THE DRAWINGS

The present disclosure is illustrated by way of example and not limited in the accompanying figures in which like reference numerals indicate similar elements and in which.

DETAILED DESCRIPTION

The disclosure generally relates to knowledge retrieval using a knowledgebase containing at least both general and/or expert knowledge. In particular, the disclosure relates to using complex retrieval techniques to implement an enhanced troubleshooting system that provides relevant information. While prior systems are known for retrieving documents based on a manual search query entered by a technician that is attempting to troubleshoot a problem, prior techniques fail, inter alia, to retrieve certain kinds of documents that the system and method contemplated herein is able to retrieve. Various embodiments in accordance with aspects of the disclosure retrieve relevant documents to assist in troubleshooting by reasoning with stored representations about the faulty system and its operating environment. After receiving a description of the symptoms and/or other information related to the problem, a system in accordance with the disclosure may recommend textual and/or non-textual documents with relevant information for identifying the cause of the problem and restoring operation.

Furthermore, aspects of the disclosure rely on a backend system comprising a representation (e.g., a multidimensional vector space) of knowledge to assist in retrieval of relevant information. The representation may include various types of information. For example, one representation may include information about general knowledge. Another representation may include information specific to a particular company or industry (e.g., company-specific knowledge). Yet another representation may include all documents of a particular type (e.g., all documents listing changes made to a system, such as a revision history). These representations may be combined together to form a single, optimized representation in a knowledgebase for the system to use, analyze, and maintain. The knowledgebase may be used to assist in troubleshooting and restoration of a faulty system.

Figure 1:
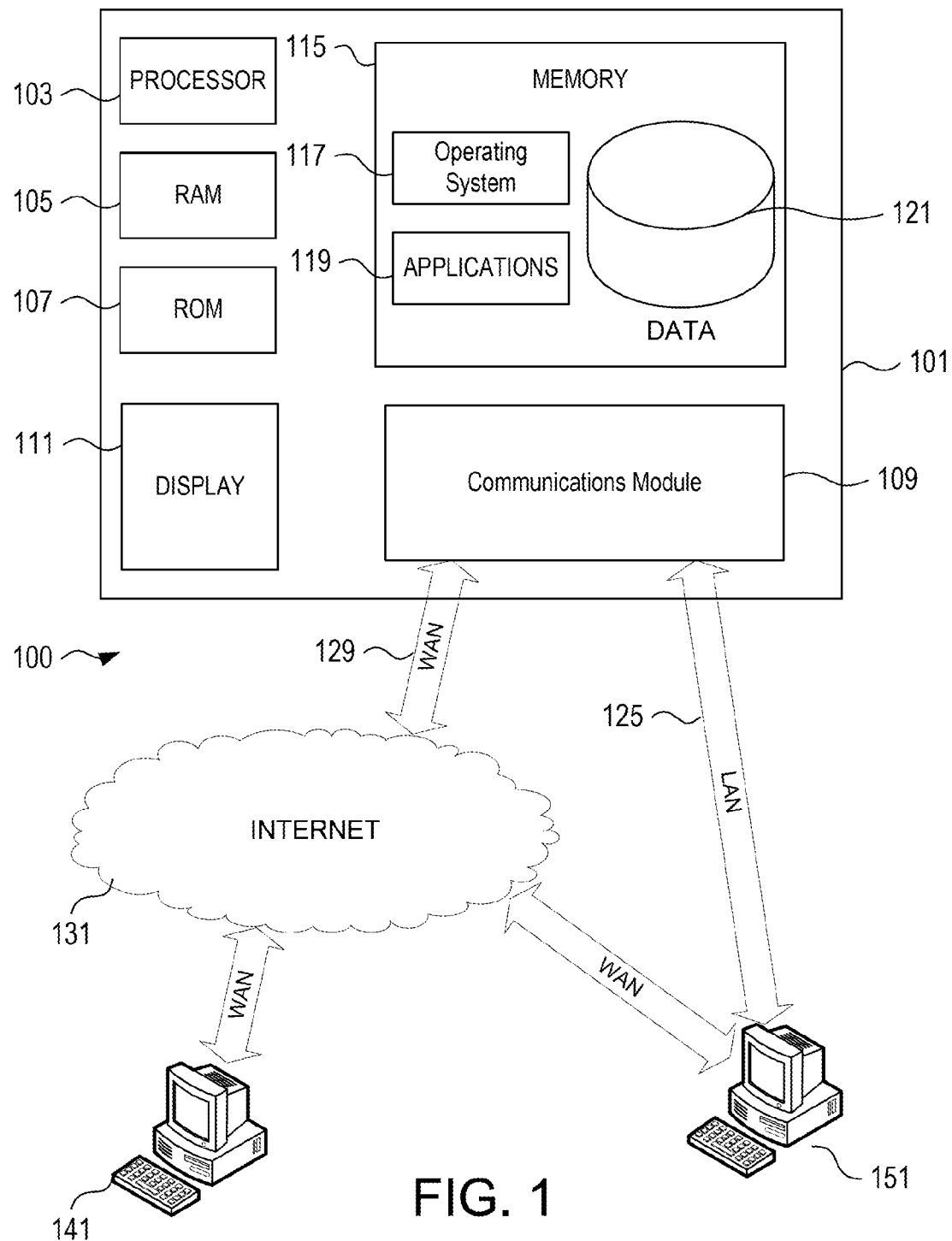
FIG. 1 illustrates a schematic diagram of a general-purpose digital computing environment in which various illustrative aspects of the disclosure may be implemented.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device 111 for providing textual, audio-visual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and a data store 121. Alternatively, some or all of the computer executable instructions for computing device 101 may be embodied in hardware or firmware (not shown). As described in detail below, the data store 121 may provide centralized storage (e.g., backup storage) for the entire business, allowing interoperability between different elements of the business residing at different physical locations. In some embodiments, the data store 121 may be physically located external to memory 115. For example, the data store 121 may be an enterprise database located at computing device 151.

Computing device 101 may operate in a networked environment supporting connections to one or more remote computing devices (e.g., remote database systems), such as devices 141 and 151. The computing devices 141 and 151 may be personal computing devices or servers that include many or all of the elements described above relative to the computing device 101. The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet or intranet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
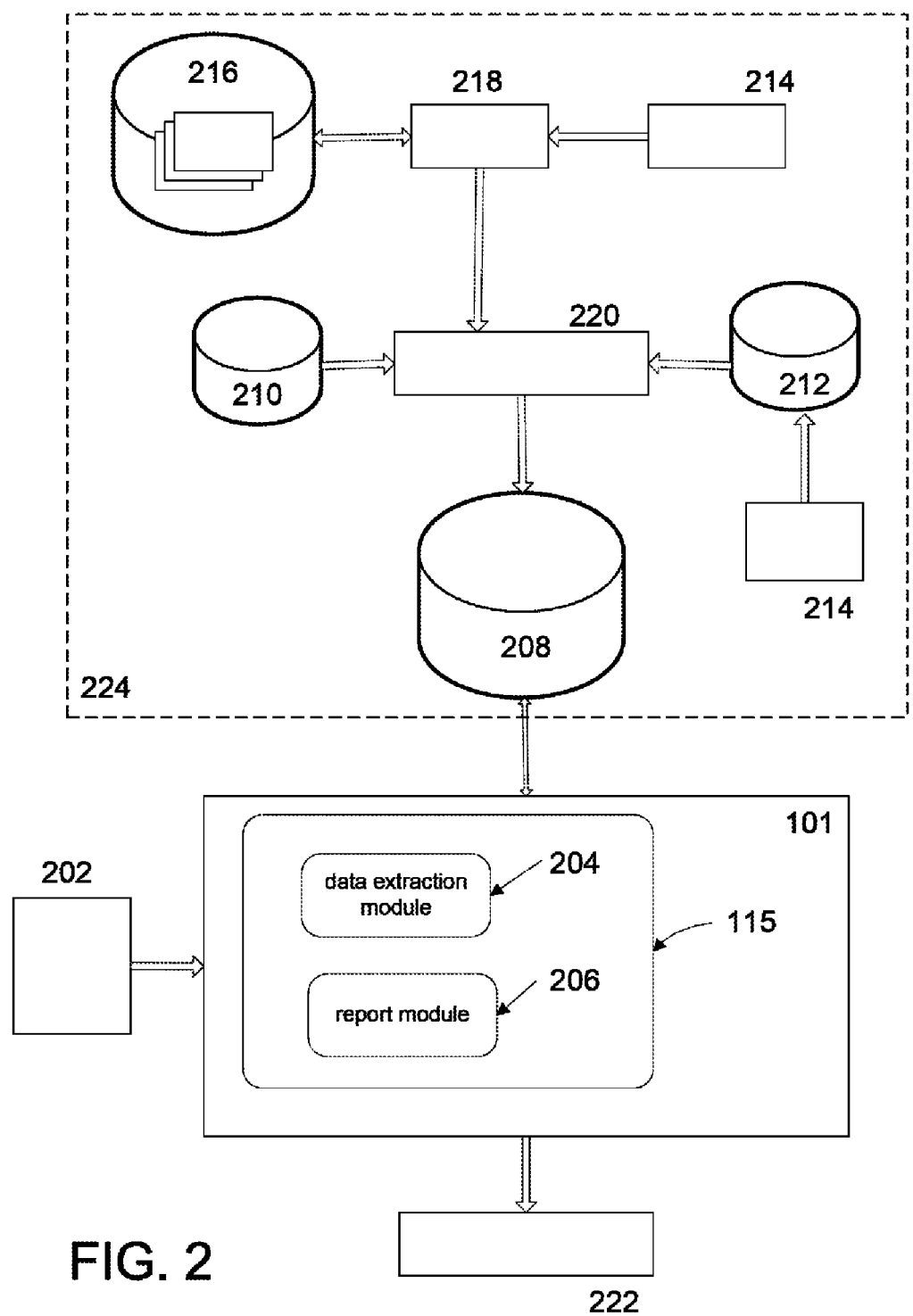
FIG. 2 illustrates a high-level diagram of an illustrative system in accordance with various aspects of the disclosure.

Referring to FIG. 2, that figures illustrates a high-level diagram of an illustrative system in accordance with various aspects of the disclosure. A computing device 101, as illustrated in FIG. 1, may store various modules (e.g., data extraction module 204 and report module 206) in memory 115. These modules may comprise computer-executable instructions that, when executed by a processor 103, cause the system to provide relevant information (e.g., documents, images, etc.) that may assist in troubleshooting a faulty system. The computing device 101 communicates with a backend system 224 to identify the relevant information.

The backend system 224, as illustrated in FIG. 2, includes numerous components. Each component is described in-turn below. In general, the backend system 224 may pre-compile and analyze connections between events, objects, and other things, along with the way they are expressed in language. The connections may be discovered using, inter alia, complex techniques of principal component analysis and Bayesian mixture models. Such connections and the nodes that surround these connections may represent a knowledge base in a multidimensional vector space. The multidimensional vector space (i.e., a representation) may be used to organize ideas into categories, detect topics in free text, compare concepts on arbitrary scales that may be generated on the fly, and/or reason by analogy and association over the representation. The representation may be combined in various ways with other representations (e.g., a general knowledge representation, a company-specific knowledge representation, etc.) to permit a convenient, comprehensive analysis of its semantic data. The combined, optimized representation may also be convenient for natural language processing and intelligent user interfaces. The results of an analysis of the combined representation may include relationships not previously expressed in the original data, but which have been deduced/inferred from the representation. One skilled in the art will appreciate, after review of the entirety disclosed herein, that systems are publicly available providing various aforementioned features of the backend system 224.

The backend system 224 may include a general knowledge representation 210. Such a representation may include a collection of general knowledge about the world stated as natural language assertions that specify the conceptual relationships holding among entities, which are sometimes referred to as concepts. General knowledge representations are publicly available and such a representation may be used in the implementation of backend system 224.

In addition, the backend system 224 may include a company-specific knowledge representation 212. Such a representation may include a collection of expert knowledge about a particular company or industry (or any other grouping of information) stated as natural language assertions that specify the conceptual relationships holding among entities (i.e., concepts). The disclosure contemplates company-specific knowledge representation 212 to not be limited to simply a company. Rather, the term "company-specific" is used herein simply to convey that the information involved is not merely general knowledge, but expert knowledge specific to a particular company, industry, profession, product, etc. A company-specific knowledge representation 212 may be generated using publicly available techniques and systems. However, the information 214 used to generate a company-specific knowledge representation 212 may include information confidential and proprietary to a particular company. For example, internal system names and trade secret information may be used to generate company-specific knowledge representation 212. As such, in some embodiments in accordance with the disclosure, it may be desirable to place the knowledgebase including the representation 212 in a secure environment, such as behind a firewall, to prevent unauthorized access.

In addition, the backend system 224 may include a change knowledge representation 216. Such a representation may include a record of changes that have occurred to a particular software installation or product and/or a collection of expert knowledge about changes stated as natural language assertions that specify the conceptual relationships holding among entities (i.e., concepts). The change knowledge representation 216 may be generated using publicly available techniques and systems. However, the information used to generate the representation 216 may include confidential and proprietary documents, e.g., of a particular company. For example, change documents, such as documents listing previous changes to a system, previous incident tickets listing prior bugs in the system, software revision history, software patch installations, hardware updates, and other information, may be inputted to backend system 224 to "train" the change knowledge representation 216 about the change history of a particular system or entity. The concepts in the change documents may be extracted in block 218 of the backend system 224 and sent to change knowledge representation 216 for storage and maintenance.

In addition, change knowledge representation 216 may be supplemented by documents 214 inputted to backend system 224. Such documents 214 may include, but are not limited to, network architecture diagrams (e.g., diagrams of network topology, UML diagrams of software components, etc.), data flows (e.g., diagrams of key applications and processes) and/or troubleshooting playbooks (e.g., documents provide a step-by-step recommendation based on the symptoms described). These documents 214 may be analyzed at block 218 of the backend system, and the extracted concepts (in addition to any other semantic data identified) may be integrated into the change knowledge representation 216. One skilled in the art will recognize that the functionality of block 218, which includes identification of concepts through analysis of free text collected, is a publicly available technique available in prior art systems. The net result of the aforementioned is that change knowledge representation 216 serves as an expert knowledgebase about the systems of interest, specifically the changes made to those systems, and potentially any other design documents or recommended fixes to a problem with the system.

Since change documents (and other information 214) is continuously being created (e.g., by technical writers, project managers, programmers, engineers, etc.), any new documents may be inputted to backend system 224 for analysis and incorporation into the expert knowledgebase. The expert knowledgebase may be updated at a periodic interval (e.g., batch nightly, daily, weekly, realtime, near realtime). In some embodiments in accordance with aspects of the disclosure, some of the information 214 may be incorporated into the company-specific knowledge representation 212. In other embodiments, the information 214 may be incorporated into the change knowledge representation 216. In yet another embodiment, the information 214 may be incorporated into both representations 212 and 216.

In any event, the backend system 224 may combine the numerous representations 210, 212, 216 in block 220 into a single, optimized knowledgebase 208. Block 220 may provide a functionality that is publicly available in prior art systems. Block 220 may combine the assertions in the various representations and process them to create an optimized semantic-like network representation in which the concepts they reference are linked together. This semantic network-like representation is subsequently converted to a mathematical form (e.g., a matrix) and optimized to permit more efficient/effective comparisons. The optimized knowledgebase 208 may interact with computing device 101 over a network (e.g., LAN 125 or WAN 129) to provide relevant information/documents using enhanced retrieval techniques.

Computing device 101 may assist a troubleshooter in debugging a problem with a system. For example, a programmer may visit a website for assistance in troubleshooting a problem. The web server may be in communication with an application server, such as computing device 101, to request relevant information for the programmer's benefit. One skilled in the art will appreciate that in other embodiments the computing device 101 may be a standalone computer which a programmer may access directly. The programmer may, for example, find that customers attempting to use a system experience high rates of latency which causes timeouts and errors. This results in numerous failed customer interactions (FCIs) to be generated. In troubleshooting the problem, the programmer may consult, directly or indirectly, with computing device 101 to obtain assistance.

Figure 3:
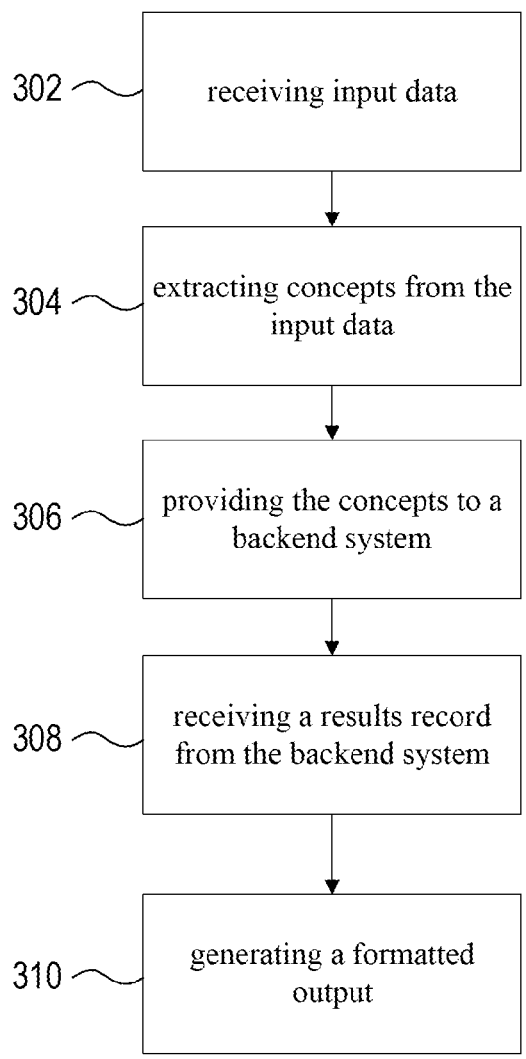
FIG. 3 illustrates a high-level flowchart illustrating numerous steps in accordance with various illustrative aspects of the disclosure.

FIG. 3 illustrates a high-level flowchart illustrating numerous steps that the computing device 101 and/or backend system 224 may perform to assist the hypothetical programmer. In step 302, the programmer may submit a description of the problem to the computing device 101. Alternatively, the programmer may provide an identifier of a document (e.g., an incident ticket) that the data extraction module 204 in the computing device 101 may use to lookup and retrieve the associated textual description of the problem. In yet another embodiment, the programmer viewing an incident ticket on his her display may be sufficient to trigger an automatic submission of the ticket number to computing device 101 to retrieve possibly relevant information. The programmer's display may visually indicate (e.g., using an icon or graphic) that additional information is available should the programmer desire assistance in troubleshooting. As a result, in step 302, the computing device 101 receives input data, where the input data ultimately includes a description of symptoms troubling the system (e.g., a high number of FCIs).

In step 304, the computing device 101 extracts concepts from the input data. For example, words, phrases, and relationships of significance may be identified and may be populated into a data structure (e.g., a concept vector or term vector). The data structure may be provided (in step 306) to the backend system 224. The data extraction module 204 may assist in creating and passing the concept vector. As explained earlier, the backend system 224 may include an optimized knowledge base 208 that is formed by combining the general knowledge representation 210 and/or the company-specific knowledge representation 212 with a change knowledge representation 216. The company-specific knowledge representation 212 and the change knowledge representation 216 may collectively be referenced as the expert knowledgebase.

After receiving the concept vector, the backend system 224 analyzes the vector as described above. When troubleshooting a problem, the backend system 224 processes the account of the symptoms of the problem and other associated information to find the concepts they mention, and then uses these concepts to query the previously created representation to find relevant change documents. Techniques and algorithms for analyzing the concept vector would be known to those of skill in the art after review of the entirety disclosed herein. As a result, in step 308, the backend system 224 may send a results record from the backend system to the computing device 101. The results record may be in XML format or any other format amenable to transmitting data.

The report module 206 in the computing device 101 may, in step 310, process the results record and generate a formatted output. The formatted output may be displayed to the hypothetical programmer as a basic search results screen with a list of relevant documents. Alternatively, the output may be integrated into an existing graphical user interface (GUI) of an existing system. For example, a portion of an existing troubleshooting system may include a display window showing relevant documents that may be of interest to the programmer. The programmer can choose to view or ignore these documents. In some embodiments, the retrieved documents may include information about a system's structure and functions, in addition to listing changes to the system.

Although not required, one of ordinary skill in the art will appreciate that various aspects described herein may be embodied as a method, a data processing system, or as a computer-readable medium storing computer-executable instructions. Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. In addition, the steps described herein may be performed using a processor executing computer-executable instructions stored on a computer-readable medium. The processor may also be in communication with a display screen (or other output device, e.g. printer) for outputting the appropriate information in accordance with aspects of the invention. Moreover, the graphical user interface may be provided in a similar fashion through a web browser interface.

Finally, while portions of the disclosure have been described in terms of an engineer/programmer troubleshooting a software system, one skilled in the art will appreciate after review of the entirety disclosed herein that the troubleshooting applications may be applied to other contexts, e.g., in the diagnosis of a medical condition, in the diagnosis of a mechanical failure in a vehicle, in assisting a plumber/electrician in resolving a problem in a building, and other examples. In each of these embodiments, a recommender like the one disclosed herein may be used to search through the history of changes and design documents to find information that either explains the possible cause of the problem or assist in restoring normal operation.

We claim:

1. A method of an enhanced troubleshooting system, the method comprising:
   a. receiving input data, where the input data comprises a description of symptoms troubling a system;
   b. extracting concepts from the input data;
   c. providing the concepts to a backend system, where the backend system comprises an optimized knowledgebase combining a company-specific knowledge representation and a change knowledge representation;
   d. receiving a results record from the backend system in response to the providing of the concepts; and e. generating, using a reporting module, a formatted output using the results record, where the formatted output provides information to assist in troubleshooting the system, where the optimized knowledgebase includes a general knowledge representation, and where the company-specific knowledge representation, the change knowledge representation, and the general knowledge representation each are stated as natural language assertions that specify conceptual relationships holding among entities.

2. The method of claim 1, where the step of extracting concepts from the input data includes populating a data structure with the concepts, and where the step of providing the concepts to the backend system includes sending the data structure to the backend system.

3. The method of claim 1, further comprising: sending change documents to the backend system to update the change knowledge representation at a periodic interval.

4. The method of claim 3, where the periodic interval is daily.

5. The method of claim 1, further comprising: sending network architecture diagrams to the backend system to update the change knowledge representation.

6. The method of claim 1, where the input data is automatically retrieved from a document using a data extraction module.

7. The method of claim 6, where the document is an incident ticket.

8. The method of claim 1, where the input data is entered by a user attempting to troubleshoot the system.

9. The method of claim 1, where the formatted output is integrated into an existing graphical user interface to further assist in troubleshooting the system.

10. The method of claim 1, where the formatted output is in a form of an ordered list.

11. An apparatus comprising:
a. an electronic processor;
b. a computer memory storing modules configured to be executed by the processor, the modules comprising:
  i. a data extraction module configured to extract concepts from input data and provide the concepts to a backend system; and
  ii. a report module configured to receive a results record from the backend system in response to the data extraction module providing the concepts to the backend system and formatting output using the results record; and
c. a communications interface configured to receive the input data comprising a description of symptoms troubling a system, and send formatted output, where the backend system comprises an optimized knowledgebase combining a company-specific knowledge representation and a change knowledge representation, and where the optimized knowledgebase further combines a general knowledge representation, and where the company-specific knowledge representation, the change knowledge representation, and the general knowledge representation each are stated as natural language assertions that specify conceptual relationships holding among entities.

12. The method of claim 1, wherein the change knowledge representation comprises at least one document listing previous changes to the system, at least one previous incident ticket listing prior bugs in the system, software revision history, software patch installations, and hardware updates.

13. The apparatus of claim 11, where the change knowledge representation is updated on a periodic basis.

14. The apparatus of claim 11, where the optimized knowledgebase further combines an expert knowledge representation.

15. The apparatus of claim 11, where the data extraction module provides the concepts to the backend system using a concept vector.

16. A non-transitory computer-readable medium storing computer-executable instructions that, when executed by a processor, cause a system to perform steps of:
a. receiving input data, where the input data comprises a description of symptoms troubling the system;
b. extracting concepts from the input data;
c. populating a data structure with the concepts;
d. sending the data structure to a backend system, where the backend system comprises an optimized knowledgebase combining a general knowledge representation, a company-specific knowledge representation, and a change knowledge representation;
e. receiving a results record from the backend system in response to the providing of the concepts; and
f. generating, using a reporting module, a formatted output using the results record, where the formatted output provides information to assist in troubleshooting the system, where the input data is automatically retrieved from a document using a data extraction module, and where the input data is automatically retrieved from the document responsive to the document being selected for display, and wherein a generated display of the document provides an indication that the information is available to assist in troubleshooting the system.

17. The non-transitory computer-readable medium of claim 16, where the document is an incident ticket.

18. The non-transitory computer-readable medium of claim 16, where the formatted output is preconfigured to be integrated into an external troubleshooting application.

19. The non-transitory computer-readable medium of claim 16, where the data structure is a concept vector.

* * * * *